(12) United States Patent
McCall et al.

(10) Patent No.: US 6,288,645 B1
(45) Date of Patent: Sep. 11, 2001

(54) ELECTRONIC LOCATION TAG

(75) Inventors: Colin David McCall, Glasgow; Frank Martin Orr; Gavin Munro Cameron, both of Greenock, all of (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/634,397

(22) Filed: Aug. 9, 2000

(30) Foreign Application Priority Data

Dec. 21, 1999 (GB) .................................................. 9930148

(51) Int. Cl.[7] .................................................. G08B 13/14
(52) U.S. Cl. ..................... 340/568.2; 340/568.1; 340/572.4
(58) Field of Search .............................. 340/10.1, 10.51, 340/10.52, 572.1, 572.3, 568.1, 568.2, 568.3, 533, 538; 707/203; 712/1, 200; 717/1, 4

(56) References Cited

U.S. PATENT DOCUMENTS

| | | | |
|---|---|---|---|
| 5,689,242 | * 11/1997 | Sims et al. ........................ | 340/568.3 |
| 5,828,831 | * 10/1998 | Kong ................................. | 713/200 |
| 6,046,676 | * 4/2000 | Ward et al. ....................... | 340/572.1 |
| 6,161,200 | * 12/2000 | Rees et al. ........................ | 717/1 |
| 6,177,860 | * 1/2001 | Cromer et al. ................... | 340/10.1 |

FOREIGN PATENT DOCUMENTS

| | | |
|---|---|---|
| 2257278 | 6/1993 | (GB) . |
| 2262372 | 6/1993 | (GB) . |
| WO 87/04282 | 7/1987 | (WO) . |
| WO 96/03787 | 2/1996 | (WO) . |
| WO 97/20295 | 6/1997 | (WO) . |
| WO 98/18109 | 4/1998 | (WO) . |

* cited by examiner

*Primary Examiner*—Van T. Trieu
(74) *Attorney, Agent, or Firm*—Louis J. Percello; Fitch, Even, Tabin & Flannery

(57) ABSTRACT

An electronic location tag comprises stored data which includes a identifier. The data is transmitted to an attached data processing system through an interface. The attached data processing system is adapted to initiate a security action responsive to receiving the identifier. The electronic location tag is adapted to be physically attached to the environment surrounding the tag.

20 Claims, 3 Drawing Sheets

ELECTRONIC LOCATION TAG

FIELD OF THE INVENTION

The present invention relates to a method for determining the physical location of data processing equipment and to detecting changes in the physical location of data processing equipment.

BACKGROUND OF THE INVENTION

Desktop personal computers are valuable pieces of equipment and are frequently easily movable from one location to another. Presently, physical security can be used to ensure that a personal computer is not moved from one location to another, but such physical security is not always practical in an office environment. When a personal computer has been moved, there is no easy way of detecting its new location.

The universal serial bus ("USB") is specified to be an industry standard extension to the personal computer architecture with a focus on computer telephony interface, consumer and productivity applications. The USB architecture is described in the "Universal Serial Bus Specification", Revision 1.1, Sep. 23, 1998 available on the Internet World Wide Web at http://www.usb.org/developers/docs.html. The USB architecture provides for ease of use of peripheral expansion, transfer rates up to 12 megabits per second, protocol flexibility for mixed modes, isochronous data transfers, and asynchronous messaging. USB is a cable bus supporting data transfer between the host personal computer and a range of simultaneously accessible peripherals. The bus allows peripherals to be attached, configured, used and detached while the host and other peripherals are in operation. One host controller can support up to 127 physical devices using a tiered topology. A hub is at the centre of each star with each wire segment creating a point-to-point connection of up to 5 meters. The 5 meter limitation may be between a host and a hub or a hub function or a hub connected to another hub or function.

Pending GB patent application 99020722.7 discloses the tracking of objects within a building using a radio device associated with each object to be tracked and an array of transmitting beacons.

Pinpoint Corporation (see www.pinpointco.com) market a solution to asset location using a proprietary radio technology. Their solution is much more expensive and does not integrate into standard systems management tools.

Solutions based on detecting the personal computer's LAN attachment point only work if the attachment point can be traced through the network hubs, which is not generally the case with Ethernet or TokenRing systems. Where it is possible, continued tracking of the location depends on the physical LAN topology remaining unchanged.

So it would be desirable to provide a mechanism for determining the location of a personal computer that did not require the use of a radio device attached to each object, which could be integrated with standard systems management tools and which did not depend on knowing the computer's LAN attachment point.

DISCLOSURE OF THE INVENTION

Accordingly, the present invention provides a method of determining the physical location of a data processing system, the method comprising the steps of: providing a data tag, having stored data therein including a stored identifier, the data tag being physically attached to the data processing system's environment; reading by the data processing system of data from the data tag; and responsive to the reading step, initiating a security action.

The data tag includes an identifier set at manufacture, and additionally or alternatively a programmable data area which can be set at installation. A data processing system plugs into the tag using an interface, such as a Universal Serial Bus interface and reads the identifier or data area either at boot time, or on demand. It then uses the data either as authority to boot or as location data which can be read by a management system.

The advantage of the present invention is that every data processing system in an organisation can be assigned a physical location, and any movement from that location, or a set of authorised locations, can be detected and the personal computer disabled, or an alert sent to the system administrator.

The tag technique of the present invention is currently cheaper to implement, since radio infrastructure systems, such as Bluetooth, (details of which can be found at www.bluetooth.com) will not be pervasive until about year 2002. The Bluetooth technology will be more appropriate for tracking mobile assets, while the data tag solution is more appropriate for relatively static, but moveable, assets. The data tag technique also has the capability of integration into BIOS allowing the personal computer to be completely disabled after unauthorised moves.

A further advantage of the present invention is that there is no additional wiring involved and the element identifying the location can be permanently attached to the building in which it is located.

The present invention does not prevent theft of the data processing system, and, depending on the level of additional protection in the software, may offer little protection against malicious users circumventing the system, but most problems caused by unauthorised moves are not caused maliciously, but by users who are unaware of the correct procedures or not sufficiently motivated to follow them. This invention makes it easy to track personal computers with no user intervention required except plugging a cable, such as a USB cable, into a socket on the wall, in addition to the power and LAN cables that are already required.

In a first embodiment, the security action comprises storing the data read from the data tag for later recovery. This allows the data to be interrogated by a management system at any time.

In a second embodiment, the security action comprises the step of transmitting the stored information to a remote database. This allows the stored data to be transmitted to a central management database which translates the stored data into a physical location format. This transmission can be by any means, including wireless or wired connections, but may typically be by means of a LAN attachment.

In a third embodiment, the security action comprises the steps of: comparing the data read from the data tag with stored data; and responsive to said comparison, enabling a boot process if the read data corresponds to the stored data and disabling a boot process if the read data does not corresponds to the stored data. This allows the data processing system to be prevented from operating anywhere except the authorised location without administrator password access.

In a fourth embodiment the security action comprises the steps of: checking for the presence of data read by the reading step; and responsive to the presence of data, enabling a boot process if the read data is present and disabling a boot process if the read data is not present. This allows the data processing system to be restricted from being moved from a controlled area, and being used except with another data tag without administrator password access.

The invention also provides a data tag comprising:

stored data, including a identifier; and an interface for transmitting said identifier to a data processing system attached to the interface, the data processing system being adapted to initiate a security action responsive to receiving the identifier; the data tag being adapted to be physically attached to the environment surrounding the data tag.

Preferably, the stored data in the data tag corresponds to the location of the data tag.

In a preferred embodiment, the interface is a USB interface.

The use of a USB interface is particularly advantageous to the present invention as the USB interface is a serial self configuring link.

In a further embodiment, the environment surrounding the data tag is a peripheral device and the data tag forms part of said peripheral device.

The peripheral device may be a monitor or a printer or a communications device and the use of the data tag enables interlocking of the system unit with the peripheral device. Additionally, Vital Product Data such as the serial number of the peripheral device may be required to be received by the data processing system prior to operation of the peripheral device.

In an embodiment, the data tag forms a portion of a LAN attachment port.

In an alternative embodiment, the data tag forms a portion of a power socket.

The invention also provides a data processing system comprising: an interface for receiving a identifier from a data tag, the data tag being adapted to be physically attached to the environment surrounding the data tag; and means for initiating a security action responsive to receiving the identifier.

BRIEF DESCRIPTION OF THE DRAWINGS

Embodiments of the invention will now be described, by way of example, with reference to the accompanying drawings, in which.

DETAILED DESCRIPTION OF PREFERRED EMBODIMENTS OF THE INVENTION

Figure 1:
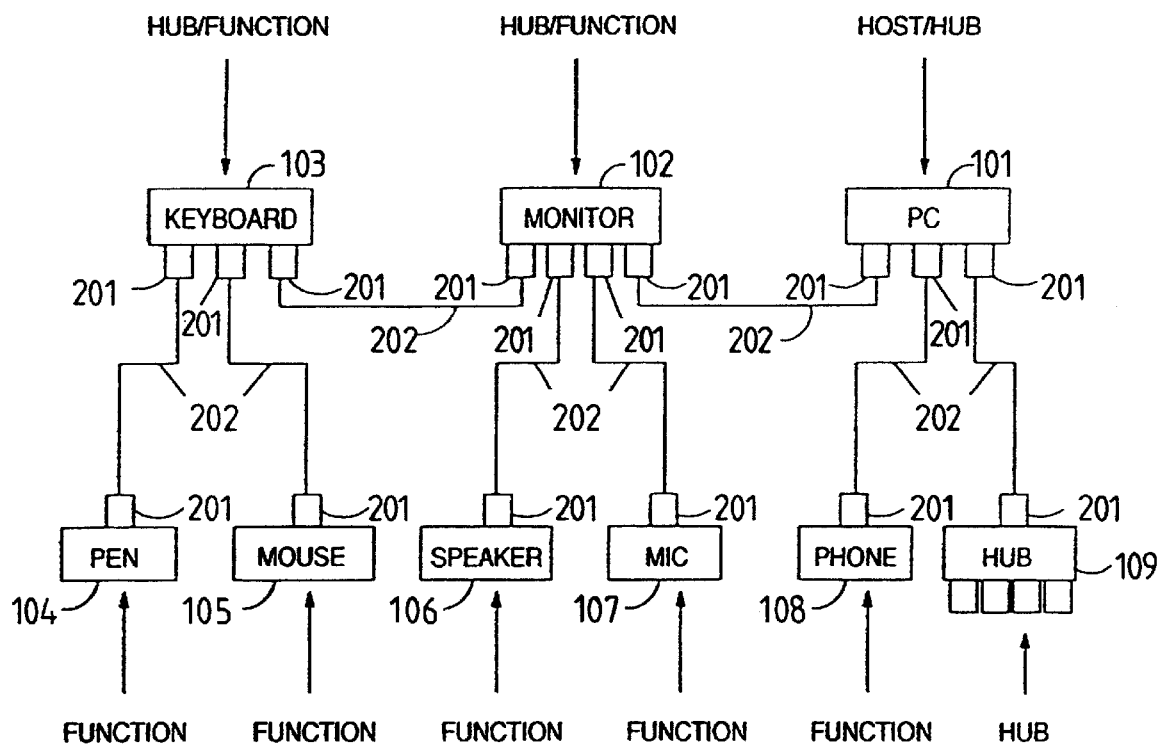
FIG. 1 is a prior art data processing system using a USB bus for interconnection.

Referring firstly to FIG. 1, there is illustrated a diagram of a prior art data processing system providing connectivity using a USB bus for other peripheral devices in a desktop environment. The data processing system shown in FIG. 1 includes personal computer 101, monitor 102, and keyboard 103. Coupled to the personal computer 101 are phone 108 and another hub 109. Coupled to monitor 102 are speaker 106 and microphone (MIC) 107. Coupled to keyboard 103 are pen 104 and mouse 105. Personal computer 101 is coupled to monitor 102, which is coupled to keyboard 103. Coupling is via USB buses 202 with USB plug connectors 201 (see FIG. 2).

A function is a USB device that is able to transmit or receive data or control information over the bus. A function is typically implemented as a separate peripheral device, such as devices 104 to 108, with a cable that plugs into a port on a hub. However, a physical package, such as devices 102 and 103, may implement multiple functions and an embedded hub with a single USB cable 202. This is known as a compound device. A compound device appears to the host 101 as a hub with one or more permanently attached USB devices. Each function contains configuration information that describes its capabilities and resource requirements. Before a function can be used, it must be configured by the host 101. This configuration includes allocating USB bandwidth and selecting function specific configuration options.

Figure 2:
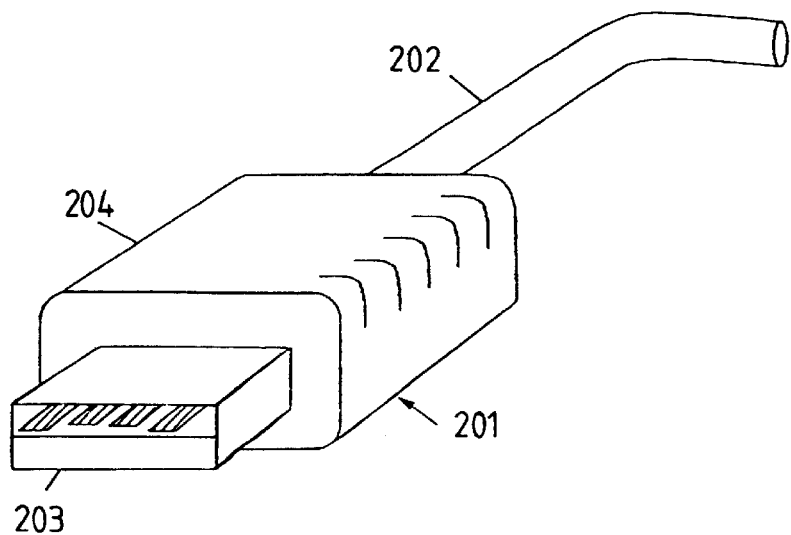
FIG. 2 illustrates a USB plug.

Referring next to FIG. 2, there is illustrated a standard USB cable plug 201 having bus 202 coupled thereto. Plug 201 includes a standard USB shielded plug housing 203, with an overmold 204, which conforms to the standard USB architecture described in the Universal Serial Bus specification referenced above. Standard USB shielded plug housing 203 operates to communicate differentially driven data signals D+ and D−, a 5-volt signal, and a ground signal.

The present invention comprises two parts, a hardware device, permanently or semi-permanently attached to a building and a software module located on the personal computer.

Figure 3:
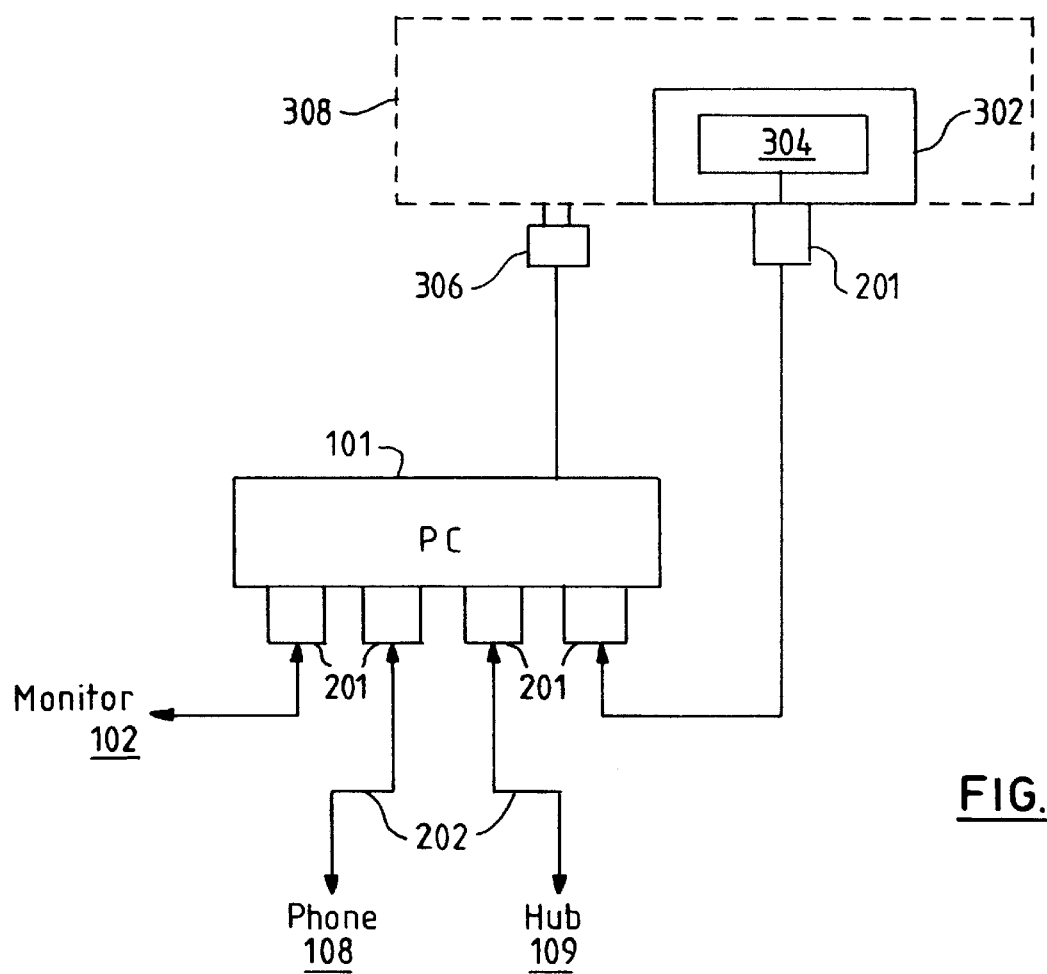
FIG. 3 is a block diagram of an electronic data tag connected to a personal computer.

Referring to FIG. 3, the hardware device is a data tag 302 comprising an electronic chip 304 wired to a USB socket preferably packaged in a standard electrical connection faceplate 308 that can be permanently or semi-permanently attached to a building. In a first embodiment, the standard electrical connection faceplate 308 is the power socket from which the personal computer 101 obtains its power through power plug 306. USB is the preferred interface, but a standard personal computer 101 serial or parallel interface could also be used. The interface to the data tag 302 must provide power to the electronic chip 304 in the data tag 302 and a data path from the data tag 302 to the personal computer 101. The chip 304 contains an identifier which is set at the time of manufacture. The identifier may be a unique identifier or it may be an identifier which the chip 304 shares with other chips, such as, for example, other chips which are to be used in the same physical location. The data tag 302 may have its identifier printed externally, though this is not necessary. In a second embodiment, the data tag 302 may also be constructed as a combined LAN attachment socket and USB data tag in a single fitting, so that the additional cost for new installations is minimized. The personal computer connects to the LAN through plug 306 in this embodiment. In a variation of the described embodiments, the data tag may be located within a peripheral device.

The USB communications protocol uses four types of transactions: Control, Bulk, Interrupt and Isochronous. The Control type of transaction is used during device enumeration to communicate device configuration information to the host. This is done in two stages: Setup and Status. The Setup stage moves request information from the host to the device, followed by zero or more Data transactions sending data in the direction indicated by the Setup transaction. The Setup stage contains three packets: Token, Data and Handshake. The Status stage returns status information from the device to the host. The data that is transferred from the data tag (USB device) to the host (personal computer) is the ID that was assigned to the data tag. That data may be transferred as a binary string, binary coded decimal, an ASCII string or any other format in which the ID may be expressed in. For further detail of implementation using the USB protocol, reference should be made to section 5.5 "Control Transfers" and section 8.5.2 "Control transfers" of the "Universal Serial Bus Specification" previously referred to.

The software module is located on the attached personal computer which reads the identifier from the chip through the personal computer USB port. The software module can behave in a variety of different ways as described below.

Figure 4:
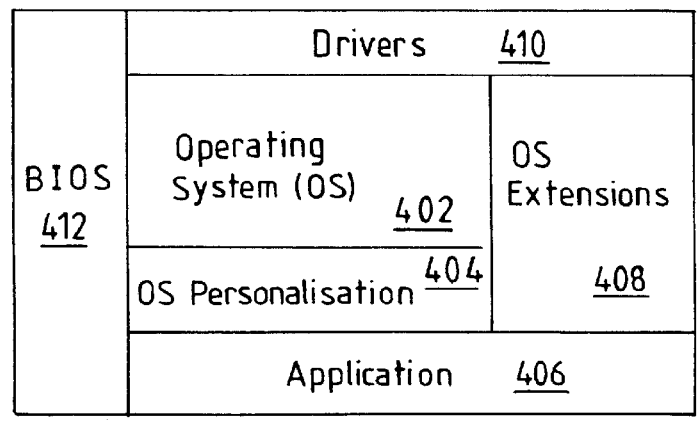
FIG. 4 is a block diagram showing the software elements used in the prior art data processing system of FIG. 1.

FIG. 4 shows the software elements that are present on a typical prior art personal computer such as that of FIG. 1. The elements include an operating system 402. Typically this may be an operating system such as Windows 95 from Microsoft, the Linux operating system or OS/2 from IBM Corporation (Windows and Microsoft are trademarks of Microsoft Corp. and OS/2 and IBM are trademarks of IBM Corp.). Personalisation files 404 may also be present. These personalisation files include such files as define the language of text to be displayed on the screen to the user. Application files 406 may be present and may include an "office suite" application such as Lotus Smartsuite from Lotus Development Corp. or Microsoft Office (Lotus and Smartsuite are trademarks of Lotus Development Corp.). Also present on the personal computer are operating system extensions 408 and device drivers 410 for hardware additions to the basic personal computer including such devices as audio devices, video devices, communications devices and mass storage devices. All of the above files are typically stored on a mass storage device which is a part of the personal computer. Typically contained within the hardware of the personal computer is BIOS (Basic Input Output Software) 412 programming code, which provides the low level interface to the system hardware. The BIOS 412 provided with the personal computer may be complemented or replaced in part, or as a whole, by routines stored on a mass storage device.

Figure 5:
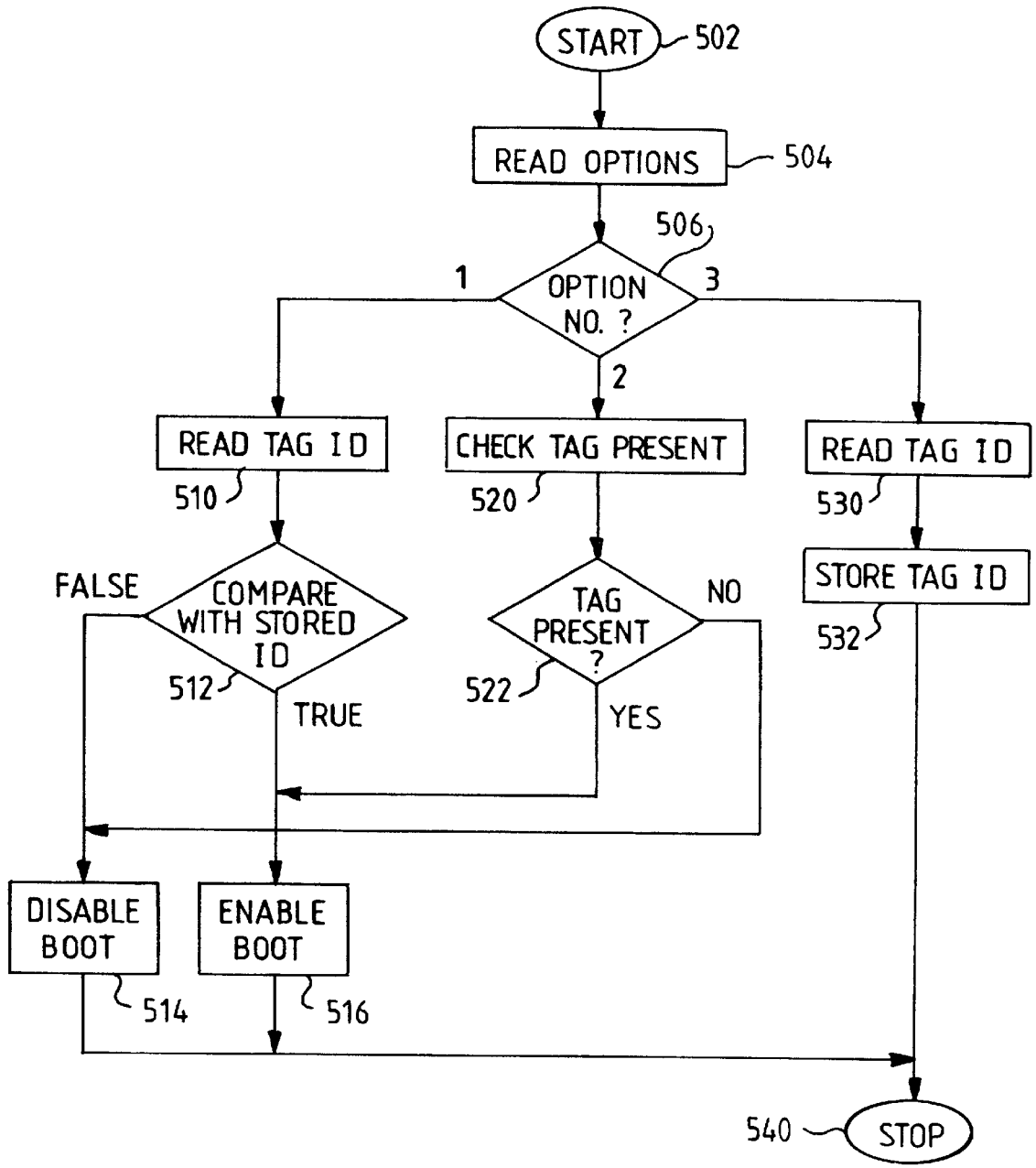
FIG. 5 is a flowchart of an embodiment of the present invention using the computer BIOS.

FIG. 5 is a flowchart of a first embodiment of the present invention using the computer BIOS in order to implement the invention. The flowchart is entered at step 502. At step 504, the BIOS in the personal computer checks on what options have been set by the administrator. The BIOS may contain the following options, accessed through the normal 'F1' options menu protected by an administrator password to prevent unauthorised end user access.

1. Detect the ID from the data tag, then disable booting if the ID is changed on a subsequent boot. This means the personal computer can not be used anywhere except the authorised location without administrator password access.
2. Check for the presence of a data tag, then disable booting if no data tag is present. This means that the personal computer can only be moved to another data tag without administrator password access, so it can not be used in an uncontrolled area.
3. Read the ID and store it in an area of memory accessible to management tools such as the Asset ID EEPROM used in IBM desktop personal computers.

At step 506, a check is made for the currently set option. Execution branches to steps 510, 520 or 530 depending on the option set. In a variation of this embodiment, the option set may be permanently set with no possibility of change by the system administrator. Any of the options may be permanently set.

If option 1 is set, then the ID is read from the data tag at step 510. At step 512, the ID which has been read from the data tag is compared with the ID which is currently stored. If the comparison is false, the personal computer is not being used at the authorised location and so, at step 514, booting is disabled. If the comparison is true, the personal computer is being used at the authorised location and so, at step 516, booting is enabled.

If option 2 is set, then the presence of the data tag is checked at step 520. This step may optionally read the ID from the data tag and discard or store the information. However, the data tag ID is not used further in the determination of the outcome of the boot process. At step 522, depending on the presence or absence of the data tag, execution proceeds to either step 516 or step 514 respectively and booting is enabled or disabled respectively. If the data tag is present, then the personal computer is being used within a controlled area and booting is permitted. If the data tag is absent, then the personal computer is not being used within a controlled area and booting is not permitted.

If option 3 is set, then the ID is read from the data tag at step 530. At step 532, the ID which has been read from the data tag is stored in an area of memory accessible to management tools such as the Asset ID EEPROM used in personal computers such as those manufactured by IBM Corporation.

Execution of the flowchart of FIG. 5 ends at step 540.

In a variation of the above embodiment, the invention is implemented using a special device driver associated with the operating system instead of the BIOS. The device driver either accesses the data tag through the USB interface, or makes use of the BIOS capability to save the ID in an accessible area of memory during boot. Options 1 and 2 are the same as described above. In this embodiment, there are options 3 and 4. These options are:

3. Read the ID at step 530 and make it available to a management system, for example, through Common Information Model (CIM) instrumentation. CIM is a general standard for management information supported by all major systems management vendors including Tivoli, Computer Associates, Hewlett Packard, Microsoft and the like.
4. Read the ID at step 530 and make a call to a central management database which translates the ID into a physical location format that is meaningful to the systems manager, such as a postal address, room number, grid location or the like. The central management database is set up at the time the data tags are installed, and is accessed by some universally available networking protocol such as HTTP. The location information is then made available to the management system through CIM instrumentation.

Either of the above options may be used and correspond to steps 530 and 523 in FIG. 5. In any of the above options, an alert can be generated to the management system using CIM, or SNMP or similar whenever the system fails to detect a data tag ID, or the data tag ID is changed.

In a variation of the preferred embodiments, the data tag contains a programmable non-volatile memory module (PROM or EEPROM) that can be written through the USB. During the installation of the data tag, a special installation program running on a personal computer is used to write user defined data to the memory module which is then read back by the detection software. This information typically contains the location data, so that there is no requirement to keep a centralised record of which data tag IDs map to which locations. This has the disadvantage that the hardware is slightly more expensive.

Although the present invention and its advantages have been described in detail, it should be understood that various changes, substitutions and alterations can be made herein without departing from the spirit and scope of the invention as defined by the appended claims.

What is claimed is:

1. A method of determining the physical location of a data processing system, the method comprising the steps of:

provided a data tag, having stored data therein including a stored identifier, the data tag being physically attached to the data processing system's environment;

reading by the data processing system of data from the data tag; and responsive to the reading step, initiating a security action.

2. The method according to claim 1 wherein the security action comprises storing the data read from the data tag for later recovery.

3. The method according to claim 2, further comprising the step of transmitting the stored information to a remote database.

4. The method according to claim 1 wherein the security action comprises the steps of:

comparing the data read from the data tag with stored data;

responsive to said comparison, enabling a boot process if the read data corresponds to the stored data and disabling a boot process if the read data does not corresponds to the stored data.

5. The method according to claim 1 wherein the security action comprises the steps of:

checking for the presence of data read by the reading step;

responsive to the presence of data, enabling a boot process if the read data is present and disabling a boot process if the read data is not present.

6. The method according to claim 1 wherein the stored data in the data tag corresponds to the location of the data tag.

7. The method according to claim 1 wherein the stored data is read from the data tag using a USB interface.

8. The method according to claim 1 wherein the data tag forms a portion of a LAN attachment port.

9. The method according to claim 1 wherein the data tag forms a portion of a power socket.

10. A data tag comprising:

stored data, including a identifier; and an interface for transmitting said identifier to a data processing system attached to the interface, the data processing system being adapted to initiate a security action responsive to receiving the identifier;

the data tag being adapted to be physically attached to the environment surrounding the data tag.

11. The data tag according to claim 10 wherein the stored data in the data tag corresponds to the location of the data tag.

12. The data tag according to claim 10 wherein the interface is a USB interface.

13. The data tag according to claim 10 wherein the data tag forms a portion of a LAN attachment port.

14. The data tag according to claim 10 wherein the data tag forms a portion of a power socket.

15. The data tag according to claim 10 wherein the environment surrounding the data tag is a peripheral device and the data tag forms part of said peripheral device.

16. A data processing system comprising:

an interface for receiving a identifier from a data tag, the data tag being adapted to be physically attached to the environment surrounding the data tag; and means for initiating a security action responsive to receiving the identifier.

17. The data processing system according to claim 16 wherein the means for initiating a security action comprises means for storing the data read from the data tag for later recovery.

18. The data processing system according to claim 17, wherein the means for initiating a security action further comprises means for transmitting the stored information to a remote database.

19. The data processing system according to claim 16 wherein the means for initiating a security action comprises:

means for comparing the data read from the data tag with stored data;

responsive to said means for comparing, means for enabling a boot process if the read data corresponds to the stored data and disabling a boot process if the read data does not corresponds to the stored data.

20. The data processing system accoridng to claim 16 wherein the means for initiating a security action comprises:

means for checking for the presence of data read from the data tag; and responsive to the presence of the data read from the security tag, means for enabling a boot process if the read data is present and means for disabling a boot process if the read data is not present.

* * * * *